(12) United States Patent (10) Patent No.: US 9,160,186 B2
Alessandro et al. (45) Date of Patent: Oct. 13, 2015

(54) BATTERY CHARGER FOR PROVIDING BATTERY PROTECTION FROM OVER DISCHARGE FROM VOLTAGE OR CURRENT AND SHIPPING MODE

(71) Applicant: STMicroelectronics S.r.l., Agrate Brianza (MI) (IT)

(72) Inventors: Agatino Antonino Alessandro, Riposto (IT); Giuliana Demilato, Francavilla Fontana (IT); Liliana Arcidiacono, Tremestieri Etneo (IT); Santi Carlo Adamo, Aci Castello (IT)

(73) Assignee: STMICROELECTRONICS S.R.L., Agrate Brianza (MB) (IT)

( * ) Notice: Subject to any disclaimer, the term of this patent is extended or adjusted under 35 U.S.C. 154(b) by 353 days.

(21) Appl. No.: 13/774,232

(22) Filed: Feb. 22, 2013

(65) Prior Publication Data

US 2013/0229145 A1 Sep. 5, 2013

(30) Foreign Application Priority Data

Mar. 2, 2012 (IT) .............................. MI2012A0333

(51) Int. Cl.
 *H02J 7/00* (2006.01)
(52) U.S. Cl.
 CPC ............. *H02J 7/0052* (2013.01); *H02J 7/0031* (2013.01); *H02J 7/008* (2013.01); *H02J 7/0009* (2013.01); *H02J 7/0022* (2013.01); *H02J 7/0024* (2013.01); *H02J 7/0068* (2013.01); *H02J 7/0077* (2013.01); *H02J 2007/004* (2013.01); *H02J 2007/0039* (2013.01); *H02J 2007/0062* (2013.01)

(58) Field of Classification Search
 CPC . H02J 2007/0062; H02J 7/0077; H02J 7/008; H02J 7/0009; H02J 7/0022; H02J 7/0024; H02J 7/0068; H02J 7/0026
 USPC .................................................. 320/107, 135
 See application file for complete search history.

(56) References Cited

U.S. PATENT DOCUMENTS

| 5,039,931 | A | * | 8/1991 | Wieland ........................ 320/104 |
| 5,177,426 | A | * | 1/1993 | Nakanishi et al. ............ 320/134 |
| 5,319,298 | A | * | 6/1994 | Wanzong et al. ............. 320/158 |
| 5,666,040 | A | * | 9/1997 | Bourbeau ..................... 320/118 |
| 5,790,961 | A | * | 8/1998 | Ingram et al. ................. 455/574 |
| 5,818,201 | A | * | 10/1998 | Stockstad et al. ............. 320/119 |
| 6,191,498 | B1 | * | 2/2001 | Chang ............................. 307/11 |
| 6,329,796 | B1 | * | 12/2001 | Popescu ........................ 320/134 |

(Continued)

OTHER PUBLICATIONS

International Search Report and Written Opinion dated Oct. 1, 2012. from corresponding Italian Application No. IT MI20120333.

(Continued)

*Primary Examiner* — Stacy Whitmore
(74) *Attorney, Agent, or Firm* — Allen, Dyer, Doppelt, Milbrath & Gilchrist, P.A.

(57) ABSTRACT

A battery charger includes an input supply terminal configured to receive a supply signal, a battery terminal configured to be connected to a battery and at least one output terminal, a switch arranged in the electrical path between the battery terminal and at least one output terminal, an element configured to store an information representative of an alarm condition of the battery and to open the switch when the alarm condition occurs, with the supply signal being absent and the battery supplying the at least one output terminal, and to close the switch when the supply signal is received at the input supply terminal.

5 Claims, 3 Drawing Sheets

(56) References Cited

U.S. PATENT DOCUMENTS

| | | | |
|---|---|---|---|
| 7,276,881 B2 * | 10/2007 | Okumura et al. | 320/134 |
| 7,391,184 B2 * | 6/2008 | Luo et al. | 320/137 |
| 7,495,416 B2 * | 2/2009 | Sato et al. | 320/134 |
| 8,441,230 B2 * | 5/2013 | Boyles et al. | 320/107 |
| 8,665,572 B2 * | 3/2014 | Liu | 361/91.1 |
| 8,729,868 B2 * | 5/2014 | Odaohhara | 320/164 |
| 8,994,341 B2 * | 3/2015 | Voorwinden et al. | 320/162 |
| 2003/0169021 A1 | 9/2003 | Kashine | |
| 2003/0220026 A1 | 11/2003 | Oki et al. | |
| 2005/0269992 A1 | 12/2005 | Lai et al. | |
| 2006/0181244 A1 * | 8/2006 | Luo et al. | 320/128 |
| 2006/0267576 A1 * | 11/2006 | Ooshita et al. | 324/134 |
| 2007/0103143 A9 * | 5/2007 | Ooshita et al. | 324/134 |
| 2008/0150488 A1 | 6/2008 | Lu et al. | |
| 2009/0009138 A1 | 1/2009 | Ahmad et al. | |
| 2009/0027013 A1 * | 1/2009 | Odaohhara | 320/160 |
| 2010/0085014 A1 * | 4/2010 | Saeki et al. | 320/134 |
| 2012/0086407 A1 * | 4/2012 | Voorwinden et al. | 320/162 |
| 2013/0038275 A1 * | 2/2013 | Chen et al. | 320/107 |
| 2013/0057217 A1 * | 3/2013 | Chen et al. | 320/114 |
| 2013/0057221 A1 * | 3/2013 | Shibata | 320/134 |
| 2013/0229145 A1 * | 9/2013 | Alessandro et al. | 320/107 |
| 2013/0241488 A1 * | 9/2013 | Dao | 320/111 |

OTHER PUBLICATIONS

Italian Search Rport and Written Opinion dated Nov. 22, 2012 from related Italian Application No. MI2012A 000332.

* cited by examiner

BATTERY CHARGER FOR PROVIDING BATTERY PROTECTION FROM OVER DISCHARGE FROM VOLTAGE OR CURRENT AND SHIPPING MODE

CROSS REFERENCE TO RELATED APPLICATIONS

This application claims the priority benefit of Italian patent application serial number MI2012A000333, filed on Mar. 2, 2012, which is hereby incorporated by reference to the maximum extent allowable by law.

BACKGROUND

1. Technical Field

The present disclosure relates to a battery charger.

2. Discussion of the Related Art

Nowadays mobile phones, digital cameras, notebooks, netbooks, tablets etc. have become daily used electronic devices. The power of the batteries of these electronic devices determines a length of time use of the electronic device. Electronic devices such as mobile phones, digital cameras, notebooks, netbooks, tablets etc. should be used with corresponding battery chargers. Generally, these battery chargers are unique to the corresponding electronic devices.

Typically, each battery charger is provided with an input terminal, such as a USB terminal, for connection to the power line for charging the battery and simultaneously powering the device connected to the battery, as shown in FIG. 1.

The battery charger 20 in FIG. 1 comprises the USB input terminal IN, a control block 10 configured to control first M1 and second M2 transistors arranged in the path between the input terminal IN and the output terminals SYS and Ld and third M3 and fourth M4 transistors arranged in the path between the input terminal IN and the battery BAT downstream the transistors M1, M2. When a supply voltage is present at the input terminal IN, the control block 10 turns on the transistors M1-M4 to provide power to the loads connected to the terminals SYS and Ld and to charge the battery BAT. When the supply voltage is not present at the input terminal IN, the control block 10 turns on the transistors M3-M4 and turn off M1-M2 so the power deriving from the battery BAT supplies the loads connected to the terminals SYS and Ld and the battery charger itself.

The control block receives an enable signal CEN an a shut-down signal SD and comprises a current modulation block adapted to control the transistor M4. Also the control block 10 is able to send an enable signal EN to a LDO block configured to supply an external load with a constant voltage by means of the output terminal Ld.

Also the battery charger comprises circuits to operate the battery disconnection when an alarm such as battery over discharge current (OCD) or battery over discharge voltage (OVD) happens, especially in the case of cheap batteries without internal protection, or when the battery will not be used for a long time to avoid battery discharge, that is the so called "shipping mode".

SUMMARY

In view of the state of the art, embodiments provide a battery charger device that reduces the battery discharge when a battery alarm occurs or during shipping mode.

According to an embodiment, there is provided of a battery charger comprising an input supply terminal configured to receive a supply signal, a battery terminal configured to be connected to a battery and at least one output terminal, a switch arranged in the electrical path between the battery terminal and said at least one output terminal, an element configured to store information data representative of an alarm condition of the battery and to open the switch when said alarm condition occurs, with the supply signal being absent and the battery supplying said at least one output terminal, and to close the switch when said supply signal is received at the input supply terminal.

BRIEF DESCRIPTION OF THE DRAWINGS

The features and advantages of the present invention will become apparent from the following detailed description of an embodiment thereof, illustrated only by way of non-limitative example in the annexed drawings, in which.

DETAILED DESCRIPTION

Figure 1:
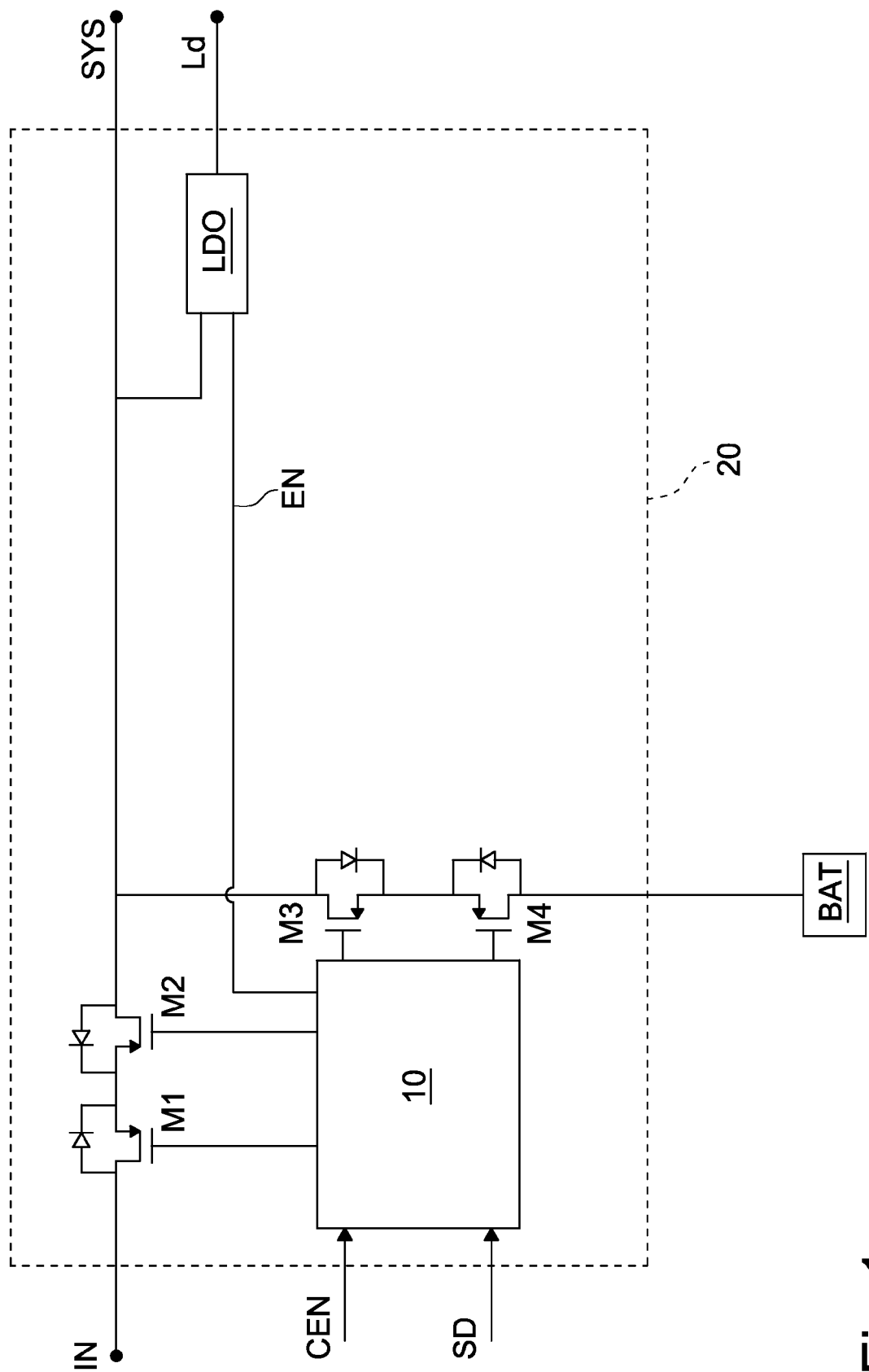
FIG. 1 shows a battery charger device according to prior art.
Figure 2:
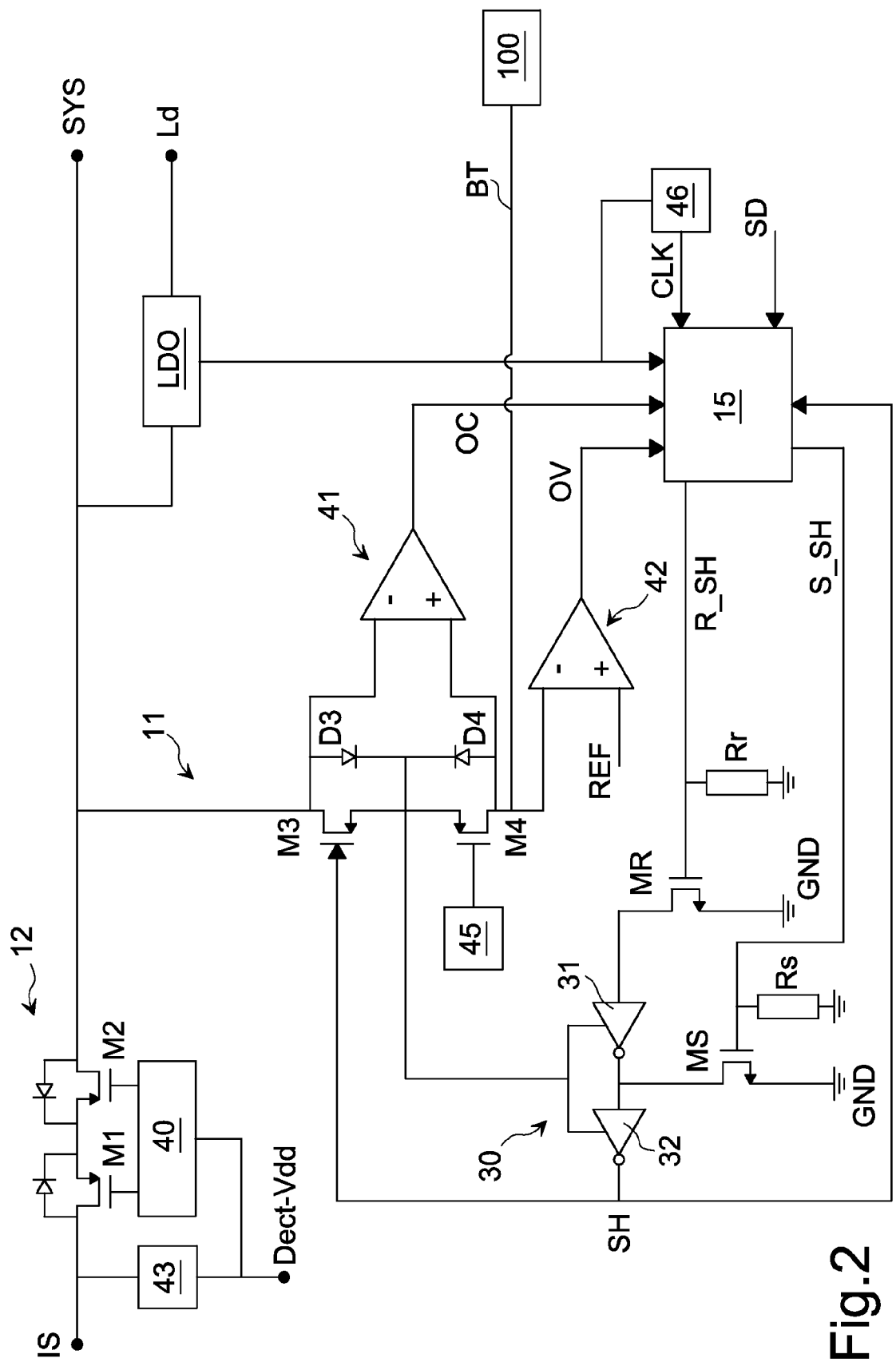
FIG. 2 shows a battery charger device according to an embodiment.

A battery charger device according to an embodiment is shown in FIG. 2.

The battery charger comprises an input supply terminal IS, for example a USB terminal, configured to receive a supply signal Vdd, a battery terminal BT configured to be connected to a battery 100, at least one output terminal SYS, Ld, a switch M3 arranged in the electrical path 11 between the at least one output terminal SYS, Ld and said battery terminal BT.

In one embodiment, the battery charger comprises two output terminal SYS and Ld and two switches M1 and M2 arranged in the electrical path 12 between the input supply terminal IS and the output terminals SYS, Ld. Preferably a circuit block LDO is connected to the electrical path 12, downstream the switches M1 and M2, an provides to supply the output terminal Ld with a constant voltage. The switches M1 and M2 are controlled by a control circuit block 40.

The battery charger comprises an element 30, for example a latch, configured to store data representative of an alarm condition, where the alarm condition is a malfunctioning condition of the battery when the battery 100 supplies the block LDO and the output terminal SYS or a shipping condition, that is when the battery is not used for a long time.

The malfunctioning condition is an over current discharge (OCD) condition or an over voltage discharge (OVD) condition which are detected by first 41 and second 42 means, in one embodiment belonging to the battery charger; the shipping condition is controlled by an external signal SD. Therefore at the presence of the signal SD or when the first 41 or second 42 means output signals OC, OV representative of the OCD or OVD condition and the battery 100 supplies the block LDO and the output terminal SYS, the alarm condition occurs and the latch 30 stores data representative of said alarm condition and opens the switch M3 when said alarm condition occurs, with the supply signal Vdd being absent.

A further switch M4 is arranged in the path 11 between the terminal BT and the switch M3; the switch M4 allows charging the battery 100 when the supply voltage Vdd is present at the input supply terminal IS and is controlled by a control circuit 45. The switches M3 and M4 are preferably PMOS transistors and the first means 41 comprise a comparator having the inverting and non-inverting input terminals connected with the drain terminals of the transistors M3 and M4 and outputting the signal OC when the signal at the inverting input is higher than the signal at the non-inverting input terminal, that is there is an over current discharge condition.

The second means 42 comprise a comparator having the inverting and non-inverting input terminals connected with the drain terminal of the transistor M4 and a voltage reference REF and outputting the signal OV when the signal at the inverting input is higher than the signal REF, that is there is an over voltage discharge condition.

A logic circuit block 15 is configured to receive the signal OC and OV from the first and second means 41, 42 and the signal SD and to generate a signal S_SH in response to the received signal only when the battery 100 supplies the block LDO and the output terminal SYS; the signal S_SH is sent to the latch 30 to store the information.

Also the logic circuit block 15 is configured to reset the latch 30 by means of a signal R_SH when the supply signal Vdd is received at the input supply terminal IS. The battery charge according to an embodiment comprises a voltage detector 43 configured to detect the presence of the supply voltage Vdd at the supply input terminal IS and to emit a signal Dect-Vdd in response to the detection.

The logic block is supplied by the block LDO and receives the signal SH at the output from the latch 30. The logic circuit block 15 is preferably a digital circuit block configured to receive a clock signal CLK deriving from an oscillator 46 supplied from the block LDO; preferably the digital circuit block is implemented by a microcontroller, a memory element storing a firmware able to set the microcontroller.

Figure 4:
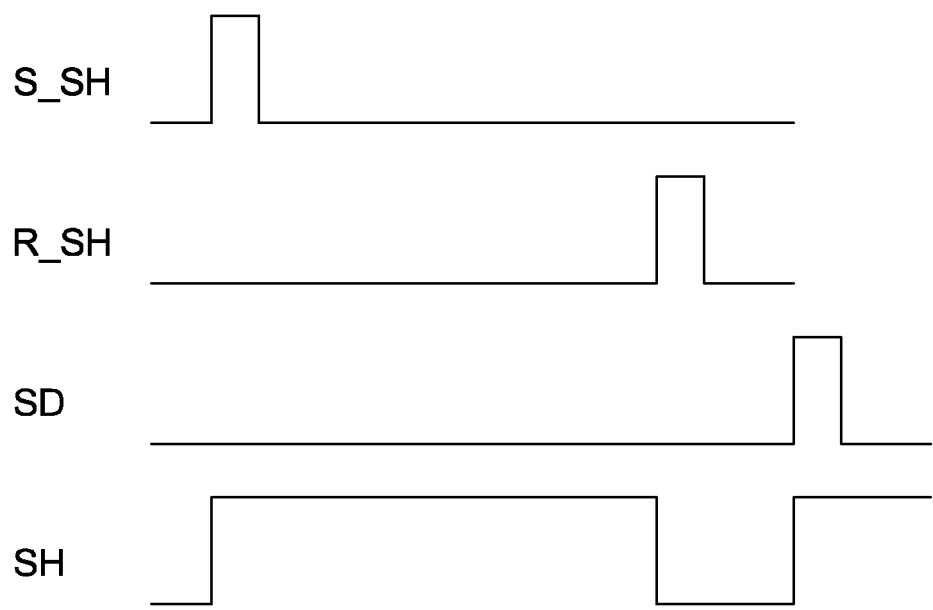
FIG. 4 is a time diagram of some signals in play in the battery charger device in FIG. 2.

The signals S_SH, R_SH and SD are preferably pulse signals, as shown in FIG. 4; the latch 30 comprises a first and a second inverter 31, 32 having the input terminal respectively connected to the drain terminals of the NMOS transistors MR and MS having the source terminals connected to ground GND and respectively driven by the signals R_SH and S_SH; resistors Rr and Rs are connected between the control gates of transistors MR and MS and ground GND. The battery charger comprises diodes D3 and D4 having the cathodes in common and connected to the source terminals of M3 and M4 and the anodes connected with the drain terminals of the transistor M3 and M4; the connection of the source terminals of M3 and M4 with the latch 30 allows the supply of the latch 30.

When the pulse of the signals S_SH and SD is present at the gate terminal of the transistor MS, the latch 30 is set and the signal SH turns off the transistor M3, while when the pulse of the signal R_SH is present at the gate terminal of the transistor MR, the latch 30 is reset and the signal SH turns on the transistor M3.

Figure 3:
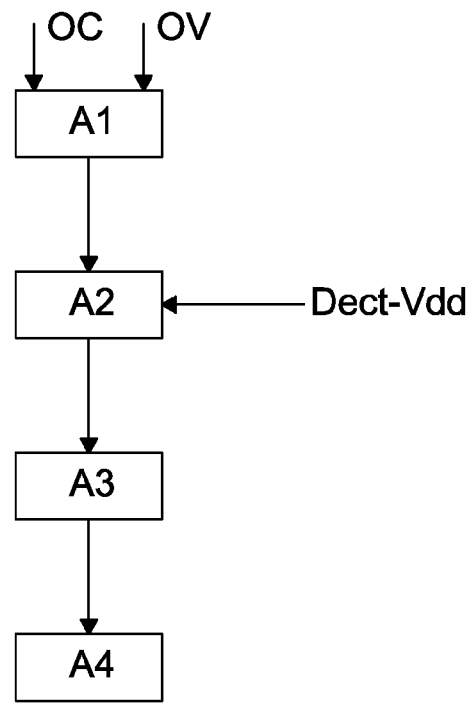
FIG. 3 shows a block diagram of the operation of the battery charger according to an embodiment.

The battery charger according to an embodiment operates according to the following method, as shown in FIG. 3.

When, in the step A1, an OCD, OVD or a shipping mode condition is present, that is when one among the signal OC, OV and SD is received by the circuit block 15 and the battery 100 supplies the block LDO and the output terminal SYS, the circuit block 15 sets the latch 30 by the signal S_SH; the latch 30 turns off the transistor M3.

If the supply voltage Vdd is detected at the supply input terminal IS by the signal Dect-Vdd, the control circuit 40 turns on the transistors M1 and M2 so that the terminals SYS and the block LDO are supplied by the voltage Vdd in the step A2.

The block LDO supplied by the signal Vdd supplies in turn the digital circuit block 15 in the step A3; the last sends a reset signal R_SH to the gate terminal of the transistor MR to reset the latch 30 and the signal SH turns on the transistor M3. The transistor M4 is turned on by the charger block 45 supplied by the block LDO; in this way the battery 100 is supplied by the voltage Vdd via the electrical path 11.

If the input terminal IS is disconnected from the supply voltage Vdd in the step A4, the terminal SYS and the block LDO are supplied by the battery 100 with the transistors M3 and M4 turned on.

The advantage of the battery charger according to an embodiment is that the current consumption in the case of said alarm condition is near to zero.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A battery charger comprising:
    an input supply terminal configured to receive a supply signal;
    a battery terminal configured to be connected to a battery and at least one output terminal;
    a switch arranged in the electrical path between the battery terminal and said at least one output terminal;
    a latch configured to store data representative of an alarm condition indicative of an over current discharge, over voltage discharge, or shipping mode of the battery and to open the switch when said alarm condition occurs, with the supply signal being absent and the battery supplying said at least one output terminal, and to close the switch when said supply signal is received at the input supply terminal;
    a first comparator configured to detect the over current discharge condition and emit a first output signal;
    a second comparator configured to detect the over voltage discharge condition and emit a second output signal; and
    a control circuit connected to first and second comparators and the latch and configured to emit a set signal to the latch in response to at least one of the output signals from the comparators or an external signal representative of the shipping mode condition when the battery supplies the at least one output terminal and emit a reset signal to the latch in response to the signal representative of the presence of a supply voltage at the input supply terminal.

2. The battery charger according to claim 1, comprising a device configured to emit a constant voltage, said device being connected to said at least one output terminal and being supplied by the supply signal or by the battery with the supply signal being absent, said device being configured to supply said control circuit.

3. The battery charger according to claim 1, comprising a connection line between the input supply terminal and said at least one output terminal and a connection line between the input supply terminal and said battery terminal.

4. The battery charger according to claim 1, wherein said switch comprises a first MOS transistor having a first intrinsic diode and a second MOS transistor including a second intrinsic diode having a cathode in common with the first intrinsic diode and with source terminals of the MOS transistors and a connection line between the cathode of the first and second intrinsic diodes and the latch.

5. A method of operating a battery charger, said battery charger comprising an input supply terminal configured to receive a supply signal, a battery terminal configured to be connected to a battery and at least one output terminal, a latch and a switch arranged in the electrical path between the battery terminal and said at least one output terminal comprising:

storing data in the latch representative of an alarm condition indicative of an over current discharge, over voltage discharge, or shipping mode of the battery and opening the switch when said alarm condition occurs, with the supply signal being absent and the battery supplying said at least one output terminal;

closing the switch when said supply signal is received at the input supply terminal, the method further comprising, detecting an over current discharge condition within a first comparator or an over voltage discharge condition within a second comparator, emitting a set signal to the latch from a controller connected to the comparators in response to at least one of an output signal from the comparators or an external signal representative of the shipping mode condition when the battery supplies the at least one output terminal, and emitting a reset signal to the latch in response to receiving a further signal representative of the presence of a supply voltage at the input supply terminal.

* * * * *